United States Patent Office 3,230,236
Patented Jan. 18, 1966

3,230,236
AROMATIC PINACOL POLYCARBOXYLIC ACIDS,
ESTERS, AND LACTONES
Carl Serres, Jr., Hammond, Ind., and Ellis K. Fields, Chicago, Ill., assignors to Standard Oil Company, Chicago, Ill., a corporation of Indiana
No Drawing. Filed Nov. 27, 1964, Ser. No. 414,463
7 Claims. (Cl. 260—343.3)

This is a continuation-in-part of application S.N. 146,003 filed October 18, 1961, now abandoned.

This invention relates to aromatic pinacol polycarboxylic acids, esters, and lactones and more particularly to aromatic pinacol polycarboxylic acids, esters, and lactones derived from benzophenone.

These acids, esters, and lactones can be used to prepare polyester resins and as plasticizers.

Polyester resins are generally produced by the polycondensation reaction of a dicarboxylic acid such as adipic acid and a dihydric alcohol or glycol such as ethylene glycol. The acid and/or alcohol may contain additional carboxyl or hydroxy groups to promote crosslinking of the polyester chains and the resin is then characterized as a thermosetting resin. Modifiers containing usually only one functional group may also be incorporated into the resin to control its average molecular weight.

Plasticizers are incorporated into resins to improve the flexibility, elongation, and other characteristics of the products prepared from the resins. Common plasticizers are the esters of phthalic acid and sebacic acid.

It has been discovered that novel compounds selected from the group consisting of acids having the formula:

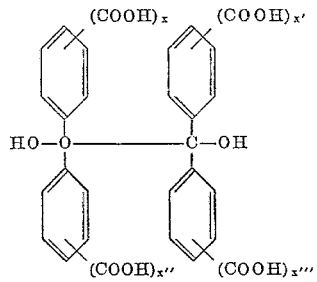

where $x$, $x'$, $x''$, and $x'''$ are each integers from 0 to 5 and $x+x'+x''+x'''$ is equal to at least 1, the organic esters of these acids with the organic radical having from 1 to about 22 carbon atoms, and the lactones of these acids and esters, are suitable for use in polyester resins and as plasticizers. Resins prepared from the acids and lactones of the acids can be used to form hard and tough surface coating films. The esters and lactones of the esters can be used as plasticizers for incorporation into polyvinyl chloride.

The acids of this invention have the formula:

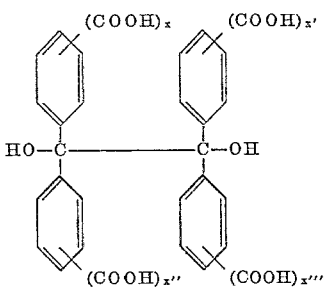

where $x$, $x'$, $x''$, and $x'''$ are each integers from 0 to 5 and preferably from 1 to 3, and $x+x'+x''+x'''$ is equal to at least 1. Especially preferred are the acids wherein $x$, $x'$, $x''$ and $x'''$ are each 1. These acids have the formula:

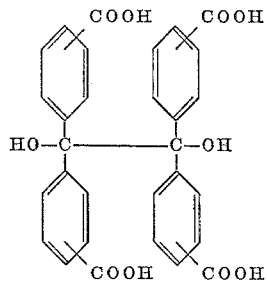

Illustrations of these acids are: 1,1-di-(4-carboxyphenyl)-1,2 - ethanediol; 1,1,2,2 - tetra-(4-carboxyphenyl)-1,2-ethanediol; 1,1,2,2 - tetra - (3,5-dicarboxyphenyl)-1,2-ethanediol; 1,1,2,2 - tetra - (2,4,6-tricarboxyphenyl)-1-2,-ethanediol; and 1,1,2,2 - tetra - (2,3,4,5,6-pentacarboxyphenyl) - 1,2-ethanediol. Other illustrations of the tetracarboxylic acids especially preferred are: 1,1,2,2-tetra-(2 - carboxyphenyl) - 1,2 - ethanediol; 1,1,2,2-tetra-(3-carboxyphenyl) - 1,2 - ethanediol; 1,1-di-(4-carboxyphenyl) - 2,2 - (3-carboxyphenyl)-1,2-ethanediol; 1,2-(4 - carboxyphenyl) - 1,2 - (3-carboxyphenyl-1,2-ethanediol; 1 - mono - (2-carboxyphenyl)-1-mono-(3-carboxyphenyl)-2,2-di-(4-carboxyphenyl)-1,2-ethanediol; and the like.

The carboxyl groups can be attached to any position on each phenyl radical, although gamma lactones are generally produced when the carboxyl group is on the ortho position of the phenyl radical.

The organic esters of these acids have an organic radical selected from the group consisting of aliphatic radicals having from 1 to about 22 carbon atoms, cycloaliphatic radicals having from 3 to about 22 carbon atoms, aromatic radicals having from 6 to about 22 carbon atoms, and mixtures of these radicals; and preferably from the group consisting of the aliphatic radicals and the cycloaliphatic radicals. Especially preferred are the unsubstituted aliphatic esters in which the aliphatic radical is devoid of alkynic unsaturation and has 1–22 carbon atoms. It is also preferred that the ester group be attached to from 1 to 3 positions and especially 1 position on each of the phenyl radicals which results in an ester having the formula:

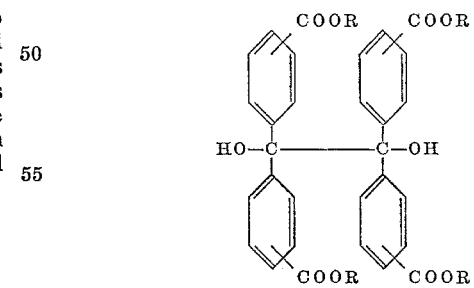

wherein R is devoid of alkynic unsaturation and has 1–22 carbon atoms.

The term "organic radical" is used to describe the group which replaces the hydrogen of the carboxyl group when the acid is esterified.

An illustrative ester of this invention is 1,1,2,2-tetra-(4-n-butyl-benzenecarboxylate)-1,2 ethanediol.

Illustrations of the alphatic radicals are the methyl, ethyl, propenyl, butyl, butenyl, decyl, hexadecyl, and docosyl radicals; of the cycloaliphatic radicals are the cyclopropyl, cyclohexyl, cyclohexenyl, bicyclodecyl, tricyclotetradecyl, and pentacyclodocosyl radicals; and of the aromatic radicals are phenyl, biphenyl, anthryl, and 3,4-benzpyrenyl. Especially preferred are the unsubstituted aliphatic esters in which the aliphatic radical is devoid of alkynic unsaturation and has 1–22 carbon atoms.

It is understood that the esters of this invention include esterified acids in which less than all of the carboxyl groups in the phenyl radical have been esterified.

The phenyl radical and the above-described organic radical may contain substituents such as halogen, aroxy, alkoxy and hydroxyl groups. Especially preferred are the unsubstituted aliphatic esters in which the aliphatic radical is devoid of alkynic unsaturation and has 1–22 carbon atoms.

The gamma lactones of the above-described acids and esters are prepared from acids having a carboxy group in the ortho position of the phenyl radical. These lactones may be either the di-gamma lactone or the mono-gamma lactone of the acids and esters. A class of the di-gamma lactones have the formula:

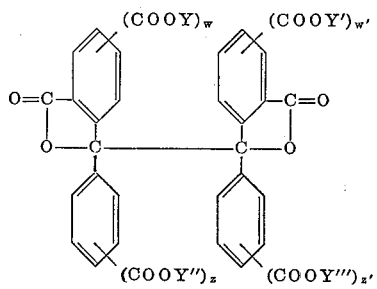

where Y, Y', Y", and Y'" are each selected from the class consisting of hydrogen and the above-described organic radical, and where $w$ and $w'$ are integers from 0 to 2 and $z$ and $z'$ are integers from 1 to 3. An illustrative dilactone is the di-gamma lactone of 1,2-(2-carboxyphenyl)-1,2-(4-carboxyphenyl)-1,2-ethanediol.

Advantageously, the lactone has the formula:

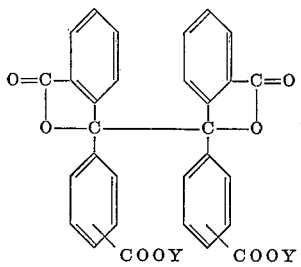

wherein each Y is either hydrogen or the above-described aliphatic radical.

Typically, the acids, esters, and lactones of this invention can be prepared by the known pinacol reduction of the benzophenone polycarboxylic acids and esters thereof dissolved in an alcohol. The secondary or primary alcohols may be used although those preferred are the secondary alcohols such as the isopropyl, isobutyl, and isopentyl alcohols. The reduction is carried out in the presence of reactants known in this art such as magnesium iodide, sodium metal, sunlight, and ultraviolet light.

*Illustrations*

One illustrative acid of this invention can be prepared by dissolving 5.4 gm. of benzophenone-4,4'-dicarboxylic acid in 1200 ml. of anhydrous isopropyl alcohol contained in a Pyrex glass cylinder, and irradiating the solution for 18 hours with a 275 watt General Electric ultraviolet lamp under air cooling to keep the temperature of the solution at approximately 30° C. Crystals will start to form after 1 hour and after 18 hours can be collected on filter paper and air dried. The product will be 1,1,2,2-tetra-(4-carboxyphenyl)-1,2 ethanediol.

One illustrative ester of this invention was prepared by exposing a saturated solution (about 5 wt. percent) of the di-n-butyl ester of benzophenone-4,4'-dicarboxylic acid (M.P. 44° C.) in isopropyl alcohol, to a 275 watt General Electric ultraviolet lamp. The solution was contained in a Pyrex glass cylinder placed a short distance (about 2") from the lamp. The temperature of the solution at the start was about 24° C. After 16 hours shiny needles of insoluble product formed. After 96 hours of exposure the mass of crystals was filtered and washed with fresh isopropyl alcohol. The dry crystals had a melting point of 149–151° C. The infrared spectrum showed a strong hydroxyl absorption band and no ketone carbonyl band. The calculated elemental analysis of the product ($C_{46}H_{54}O_{10}$) was 72.07% C and 7.05% H and that found was 71.93% C and 7.27% H. The product was 1,1,2,2 - tetra - (4-n-butyl-benzenecarboxylate)-1,2-ethanediol.

One illustrative lactone of this invention was prepared by exposing a saturated solution (about 3 wt. percent) of benzophenone - 2,4' - dicarboxylic acid in isopropyl alcohol, to sunlight for 4 days. The solution was contained in a Pyrex glass cylinder and the temperature of the solution at the start of the exposure was about 24° C. The insoluble product was filtered, washed with fresh isopropyl alcohol and dried. It had a melting point of 375–380° C. The elemental analysis was calculated to be 71.2% C and 3.5% H and was found to be 70.0% C and 4.6% H. The infrared spectrum showed no hydroxyl band. The product was the intramolecular di-gamma lactone of 1,2-(2-carboxyphenyl)-1,2-(4-carboxyphenyl)-1,2-ethanediol.

Thus having described the invention, what is claimed is:

1. A compound selected from the group consisting of a tetracarboxylic acid having the formula:

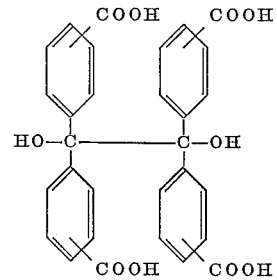

an unsubstituted tetraaliphatic ester of said acid, said aliphatic radical being devoid of alkynic unsaturation and having from 1 to 22 carbon atoms, and a di-gamma lactone of said acid.

2. An acid having the formula:

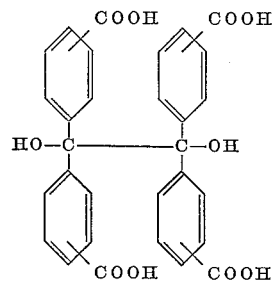

3. An ester having the formula:

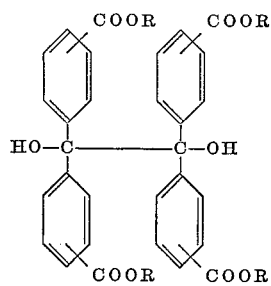

4. A lactone having the formula:
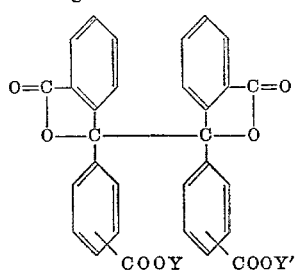
wherein Y and Y' are each hydrogen.
5. 1,1,2,2-tetra-(4-carboxyphenyl)-1,2-ethanediol.
6. 1,1,2,2 - tetra - (4-n-butyl-benzenecarboxylate)-1,2-ethanediol.
7. Di-gamma lactone of 1,2-(2-carboxyphenyl)-1,2-(4-carboxyphenyl)-1,2-ethanediol.
No references cited.
WALTER A. MODANCE, *Primary Examiner.*

UNITED STATES PATENT OFFICE
CERTIFICATE OF CORRECTION

Patent No. 3,230,236            January 18, 1966

Carl Serres, Jr., et al.

It is hereby certified that error appears in the above numbered patent requiring correction and that the said Letters Patent should read as corrected below.

Column 1, lines 34 to 45, for that portion of the formula reading "$\overset{|}{\underset{|}{HO-O-}}$" read -- $\overset{|}{\underset{|}{HO-C-}}$ --; column 4, lines 65 to 75, after the formula insert -- wherein R is devoid of alkynic unsaturation and has 1-22 carbon atoms. --.

Signed and sealed this 29th day of November 1966.

(SEAL)
Attest:

ERNEST W. SWIDER
Attesting Officer

EDWARD J. BRENNER
Commissioner of Patents